Patented Jan. 19, 1954

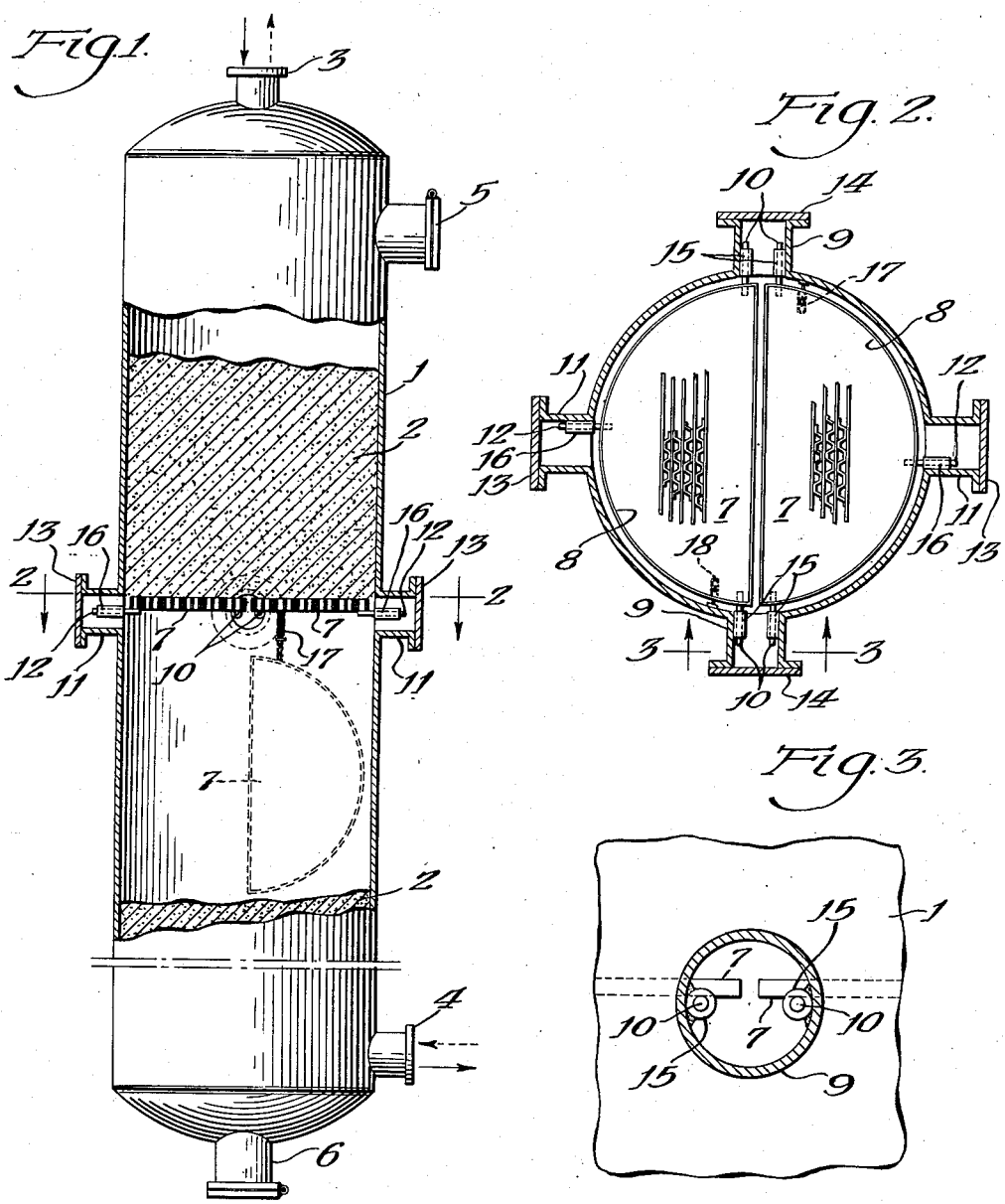

2,666,528

UNITED STATES PATENT OFFICE 2,666,528

TREATING CHAMBER

Walter N. Frandsen, Wichita Falls, Tex., assignor to Universal Oil Products Company, Chicago, Ill., a corporation of Delaware Application March 26, 1949, Serial No. 83,641

2 Claims. (Cl. 210—131)

This invention relates to an improved type of treating chamber suitable for maintaining one or more beds of solid or semi-solid material, such as a filtering medium or catalyst, which is contacted in a treating or conversion operation. The improvement is particularly directed to movable supporting plates or grids for releasably supporting the contacting beds, so that the beds may be periodically removed and replaced.

There are many types of contacting chambers now utilized in the petroleum and chemical industries in connection with treating, fractionating, or conversion processes and, of course, many types of substantially solid materials maintained within these chambers in what are generally referred to as fixed beds. The beds of material may be used to distribute countercurrently moving fluid streams or to contact a particular fluid stream passed therethrough. In a filtering chamber, the bed or beds may comprise substantially solid materials such as diatomaceous earth, filtration clays, fuller's earth, or sand and gravel, or the like materials. In conversion vessels, the bed may comprise a catalyst material which is of a granular or pellet form and may comprise any one of a number of types of catalyst, such as a silica-alumina catalyst or a silica-magnesia catalyst as used in catalytic cracking, or a solid phosphoric acid catalyst, as used in the catalytic polymerization process for converting olefin hydrocarbons into gasoline. However, both filtering and catalytic materials as well as other types of contacting beds are subject to contamination or to being substantially spent so that they must be periodically removed from the chamber and replaced with new or with reactivated materials.

The removal of fixed contact beds of material is normally accomplished by removing supporting grid plates and allowing the material to dump into the lower portion of the vessel, from which it is passed through a lower manway opening, or the like. It is also customary in many treating chambers to have a series of relatively shallow beds rather than one deep bed, such that there is less pressure drop between the top and bottom of the bed, due to the resistance of flow through the bed itself. There is usually effected a more efficient contacting of the fluid stream, by the use of a series of beds which in turn provide multiple contacting of the stream. Where one or more contacting beds are used in the chamber, it is therefore necessary that intermediate supporting means be placed across the chamber in a removable manner to hold each of the contact beds.

It is a principal object of the present invention to provide a sectionalized type of supporting grid or plate, for beds within treating chambers, that is constructed and arranged in a manner to be releasably supported, whereby the sections are substantially removed from the center portion of the chamber to permit an easier and more unobstructed removal of the solid material from beds maintained within the contacting chambers.

It is a further object of the present invention to provide a supporting grid plate of unconnected sections, and a removable pin-type of support for each of the sections, with each of the pin supports being slidably mounted within and removable from access openings which have removable covers on the exterior of the vessel wall.

Briefly, the present invention is directed to an improved treating chamber for contacting a fluid stream with one or more beds of solid particles maintained within the chamber, upper and lower openings in the chamber, perforate supporting decks removably supported horizontally across the chamber, each of the perforate decks comprising unconnected and unhinged sections that are each supported on horizontally projecting pins releasably engaged with the wall of the vessel or chamber, and each of the pins mounted in tubular supporting means in a manner permitting them to be removed from the exterior of the chamber.

In a preferable embodiment, each of the supporting grids or plates is composed of two semi-circular sections which are not connected to one another, but may be each connected to the wall of the vessel by means of a short chain or cable, such that each is maintained within the chamber at or near the point at which it is normally horizontally positioned. The semi-circular sections of the supporting grid have at least three movable supporting pins, which when removed, permit each of the sections to fall downwardly along the inside wall of the chamber, away from the central portion thereof.

The bearings or supporting sleeves for each of the removable pins are in turn fixedly positioned inside capped nozzles or handholes, or the like, which permit access to each of the pins from the exterior of the chamber. It is a further construction feature of the improved chamber, to have the handholes or access openings placed diametrically opposite one another, with one set of access openings placed opposite each other on an axis of the vessel or chamber that is in line with the abutting edges of semi-circular sections, and two removable pins in each of the access openings are positioned to accommodate the adjacent or abutting inside edges of each of the semi-circular perforated grid plates.

It is a particular advantage of the present arrangement and construction to eliminate joined or hinged constructions that form a blocking or obstruction within the center portion of the unit. It is now a rather common practice in certain catalyst-containing towers, such as polymerization chambers having beds of catalyst, which after a period of operation become gradually coated and contaminated with gummy material, to remove such beds from the chamber by means of pressure applied at the top of the bed. In other words, there are certain beds of material which tend to become solidified and to adhere to the walls of the vessel so that it does not fall out as the supporting grid plate is removed. In which case, it is necessary to either pick or bore, or alternatively, employ the hydraulic pressure method of removing the bed of material. Hydraulic pressure is applied first to the lower of the contact beds in any chamber having one or more beds, and after removal of the lower bed, the next higher bed is removed and so on until all beds are removed from the chamber. Thus, where the pressure method of removal is employed, it is advantageous to eliminate any fixed center bars, hinges or other means which may be used to support sectional portions of a grid plate, for when the bed is put under hydraulic pressure, such bar, rod or whatever, is subjected to a substantial bending pressure from the downwardly applied force on the bed.

Additional advantages and features of the improved chamber will be apparent upon reference to the accompanying drawing and the following description thereof.

Figure 1 of the drawing is an elevational view of a chamber, partially in section, indicating a contact bed of solid material and a supporting perforated deck plate and means for releasing the sections of the supporting plate from their normal horizontal position.

Figure 2 of the drawing is an enlarged sectional plan view, which shows the positioning and arrangement of the plate sections and the removable supporting pins, as indicated by line 2—2 in Figure 1 of the drawing.

Figure 3 of the drawing is a sectional elevation view through one of the access openings, which accommodates two of the removable pins, as indicated by the line 3—3 in Figure 2 of the drawing.

Referring now to Figure 1 of the drawing, there is indicated a treating chamber or vessel 1 having beds of solid granular or particle form contacting material 2, the upper end of the chamber has an inlet nozzle 3, while the lower portion of the chamber has an outlet nozzle 4, suitable to admit and remove a fluid stream for treating or conversion within the contacting beds of the vessel. Liquid reactant streams are normally passed downwardly through the contacting chambers, however, where an upward flow is desired for a particular process, the lower nozzle 4 provides an inlet and the upper nozzle 3 an outlet from the chamber 1. A manway 5 is provided at the upper end of the vessel, in order to introduce solid material into the interior of the chamber, as well as to gain access to the interior thereof. A manway 6 is also provided at the lower end of the chamber 1, in order that the solid material may be readily removed from the vessel after it has been dumped from the various beds.

Referring now to both Figure 1 and Figure 2 of the drawing, there is shown an arrangement and construction of a typical supporting grid or perforated plate as provided by the present invention, and a means for releasably supporting the grid under the bed of solid material. The supporting member comprises two semi-circular sections 7, which may be of perforated plate, subway grating, or other similar material which is of adequate strength to support the particular contacting bed and have sufficient open area for the passage of the liquid stream through the bed and grating. Where a subway grating type of material is used, preferably the exterior periphery of the member 7 is encompassed with a continuous band or rib plate 8. The two semi-circular sections 7 are not connected in any way nor hinged to the chamber, but when in their supporting horizontal position, lie adjacent one another, along a center axis of a horizontal plane of the chamber. In alignment with this center or abutting axis are two opposing access openings or handholes 9, each having therein a set of removable pins 10. While at substantially 90° to these access openings are two additional handholes or access openings 11, each having a single supporting pin 12, which is suitable to support the mid-portion or mid-circumferential portion of each of the semi-circular sections 7. The access openings 11 have suitable bolted or otherwise removable covers 13, while the access openings 9 have suitable removable covers 14.

In accordance with the present improved chamber, each of the access openings 9, having the two pins 10, there are two suitable bearings or sleeves 15, each of which is rigidly attached to the side wall of the access opening such that one of the pins may rest under one semi-circular section 7 and the other of the pins in the same access opening rest under the opposing or adjacent semi-circular section 7. The sleeves 15 may be made of pipe or tubing and welded or otherwise fixed to the wall of the chamber such that a suitable bearing or sleeve is provided for each of the pins. The pins 10 may in turn be of pipe, or of solid rod, of a suitable size with respect to the bearing members 15, that they may be easily removed or slid within the bearing and removed from under the edge of the supporting grid legs 7. Similarly, in the access openings and handholes 11, the pins 12 are supported by suitable sleeves or bearing members 16, which are in turn welded or otherwise fixed to the walls of the openings.

The pins 10 and 12 may be removed by driving them into the inside of the chamber by a suitable drift pin or the like, or alternately, they may be threaded into their respective bearing or supporting members and have a suitable head or cap which would permit their removal from under the edge of each of the grid sections, by backing them up with a suitable socket type of wrench.

Figure 3 of the drawing shows a sectional elevation view of the two supporting sleeves or bearing members 15, as mounted in one of the access openings 9, and indicates the rigid attachment of each of the sleeves 15 to the inside wall of the handhole or access opening 9.

In a preferable embodiment, each of the semi-circular sections 7 has a chain or short cable between one end and edge thereof and the inside wall of the chamber 1, so that each section is flexibly attached thereto. As indicated in the drawing, the right-hand section has a chain member 17, which permits the right-hand section 7 to hang along the inside of the wall of the chamber after the pins are removed from under the edge of the supporting member. Likewise, the other supporting section 7 has a chain or cable member 18 attached between it and the wall of the chamber 1, on the opposing side of the chamber, such that as the pins are removed from under this section, it will fall along the opposing wall of the interior of the chamber 1. The dotted outline of the right-hand section 7 is shown hanging from the chain 17, in the position it would assume after it had been allowed to fall from its normal horizontal supporting position.

As noted hereinabove, this method of substantially removing the supporting members from the central portion of the vessel, provides a substantially unobstructed interior of the chamber such that the contacting bed of solid material will readily drop away and be removed from the lower portion of the vessel by way of the manhole 6. While in the case of contacting beds which become solidified and of a gummy nature that adheres to the walls of the vessel and tends to bridge across the interior thereof, adequate room is provided for chipping out the material, or alternately, permit the use of hydraulic pressure on the top of the contacting bed. Thus, when the bed does give way under the hydraulic pressure, there are no supporting rods or beams or other members across the diameter of the vessel which tend to obstruct the downward movement and pressure of the descending bed.

While the preferred embodiment of the improved chamber and supporting means for contact beds therein has been shown in the accompanying drawing, it is not intended to limit the construction to the exact design and arrangement which is illustrated therein, for obviously, minor details and changes may be made within the scope of the present invention. For example, various types of semi-circular sections may be employed to support the contact bed within the chamber. Also, the pins 10 and 12 may be slidably or threadedly positioned within the respective sleeves or bearing members to provide their removal therefrom and the subsequent release of the perforated sections. The cover plates to each of the access openings or handholes may be bolted to a suitable flange, or otherwise made removable, but in each case, the covers are of a pressure tight construction.

Figure 1 of the drawing shows only one bed being supported on a removable grid, however, a plurality of beds and support plates, of the type provided by this improved construction, may be used in a contacting chamber.

In a modified construction, a fixed lug or pin may be used at one of the ends of each of the semi-circular sections where the two abut one another, for by removing two of the three pins under each of the sections, each section will normally fall from its horizontal position. However, preferably access openings and removable pins are used at each of the four positions for each of the supporting decks at each contacting bed, such that a more positive control is maintained over the removal and repositioning of each of the sections within the chamber.

I claim as my invention:

1. In a treating chamber adapted to contain a bed of solid material, the combination of a perforated supporting deck extending horizontally across said chamber and comprising unconnected and unhinged sections having their abutting portions supported on horizontally projecting pins each releasably engaged with a fixed bearing member mounted in an access opening on the exterior wall of said chamber, a chain attached to each of said deck sections and the wall of the chamber to permit the deck sections to hang along the chamber wall upon release of said pins.

2. The combination of claim 1 further characterized in that the bearing member is tubular and mounted in the side of the access opening, the latter being provided with a pressure-tight removable cover.

WALTER N. FRANDSEN.

References Cited in the file of this patent

UNITED STATES PATENTS

| Number | Name | Date |
|---|---|---|
| 195,573 | Chapman | Sept. 25, 1877 |
| 646,837 | Jewell | Apr. 3, 1900 |
| 2,292,716 | Pyzel | Aug. 11, 1942 |
| 2,510,984 | Kulp et al. | June 13, 1950 |